United States Patent
Wu et al.

(10) Patent No.: US 11,018,348 B2
(45) Date of Patent: May 25, 2021

(54) CATHODE AND LITHIUM-AIR BATTERY USING THE SAME

(71) Applicants: Tsinghua University, Beijing (CN); HON HAI PRECISION INDUSTRY CO., LTD., New Taipei (TW)

(72) Inventors: Yang Wu, Beijing (CN); Shun-Chao Ma, Beijing (CN); Zhang-Quan Peng, Beijing (CN); Jia-Ping Wang, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 1229 days.

(21) Appl. No.: 14/838,420

(22) Filed: Aug. 28, 2015

(65) Prior Publication Data

US 2016/0380273 A1     Dec. 29, 2016

(30) Foreign Application Priority Data

Jun. 25, 2015 (CN) .......................... 201510356105.5

(51) Int. Cl.
*H01M 4/90* (2006.01)
*H01M 4/38* (2006.01)
(Continued)

(52) U.S. Cl.
CPC ......... *H01M 4/9083* (2013.01); *H01M 4/382* (2013.01); *H01M 4/8605* (2013.01);
(Continued)

(58) Field of Classification Search
CPC .. H01M 4/9083; H01M 4/382; H01M 4/8605; H01M 4/9041; H01M 4/92;
(Continued)

(56) References Cited

U.S. PATENT DOCUMENTS

| 8,962,188 B2 | 2/2015 | Zhamu et al. |
| 2005/0175894 A1* | 8/2005 | Visco ................. H01M 2/1673 429/212 |

(Continued)

FOREIGN PATENT DOCUMENTS

| CN | 101267057 A | 9/2008 |
| CN | 102856611 | 1/2013 |

(Continued)

OTHER PUBLICATIONS

CN 102983380 A online machine translation as provided by "Patent Translate Powered by EPO and Google", translated on Jun. 22, 2019.*

*Primary Examiner* — Golam Mowla
(74) *Attorney, Agent, or Firm* — ScienBiziP, P.C.

(57) ABSTRACT

A cathode of a lithium-air battery includes a carbon nanotube composite film and a protecting layer. The carbon nanotube composite film includes a carbon nanotube network structure and a catalyst in particle form located in the carbon nanotube network structure. The carbon nanotube composite film is disposed on a surface of the protecting layer. The protecting layer allows conduction of lithium ions while preventing organic substances in an electrolyte of the lithium-air battery reaching the carbon nanotube composite film. A lithium-air battery is also disclosed.

18 Claims, 11 Drawing Sheets

(51) Int. Cl.
  *H01M 4/96* (2006.01)
  *H01M 4/86* (2006.01)
  *H01M 4/92* (2006.01)
  *H01M 4/02* (2006.01)
  *H01M 12/08* (2006.01)

(52) U.S. Cl.
  CPC ........... *H01M 4/9041* (2013.01); *H01M 4/92* (2013.01); *H01M 4/96* (2013.01); *H01M 12/08* (2013.01); *H01M 2004/027* (2013.01); *H01M 2004/8689* (2013.01); *Y02E 60/10* (2013.01)

(58) Field of Classification Search
  CPC .................. H01M 4/96; H01M 12/08; H01M 2004/8689; H01M 2004/027; Y02E 60/128
  See application file for complete search history.

(56) References Cited

U.S. PATENT DOCUMENTS

| | | |
|---|---|---|
| 2013/0168013 A1 | 7/2013 | Wang et al. |
| 2013/0244109 A1 | 9/2013 | Sabi et al. |

FOREIGN PATENT DOCUMENTS

| | | |
|---|---|---|
| CN | 102983380 A | 3/2013 |
| CN | 103187575 A | 7/2013 |
| CN | 103229343 A | 7/2013 |

* cited by examiner

CATHODE AND LITHIUM-AIR BATTERY USING THE SAME

CROSS-REFERENCE TO RELATED APPLICATIONS

This application claims all benefits accruing under 35 U.S.C. § 119 from China Patent Application No. 201510356105.5, filed on Jun. 25, 2015, in the China Intellectual Property Office. This application is related to a commonly-assigned application entitled, "CATHODE AND LITHIUM-AIR BATTERY USING THE SAME", filed ****.

FIELD

The present disclosure relates to cathodes and lithium-air batteries using the same and, and particularly to cathodes and lithium-air batteries based on carbon nanotubes.

BACKGROUND

A lithium-air battery is a chargeable/dischargeable battery that utilizes a lithium or a lithium compound in an active material of an anode electrode and oxygen gas as an active material in a cathode electrode. Oxygen gas, as the active material of the cathode electrode, can be obtained from air, and hence the cathode electrode active material need not be sealed in the battery. Therefore, the lithium-air battery realizes a capacity that is greater than that of a secondary battery that utilizes solid cathode electrode active materials.

During electrical discharging, the anode forms lithium ions and electrons, wherein the lithium ions transfer though the electrolyte and combine with the oxygen gas and the electrons at the cathode to produce a solid lithium oxide. During the reverse charging process, the solid lithium oxide decomposes to form the lithium ions, oxygen gas, and electrons, wherein the lithium ions go through the electrolyte and combine with the electrons at the anode to produce the lithium. The reaction at the cathode complies with the formula $2Li^+ + O_2 + 2e^- \leftrightarrow Li_2O_2$. The reaction at the anode complies with $Li \leftrightarrow Li^- + e^-$. The cathode comprises a porous carbon material as a conducting carrier and a catalyst carried by the porous carbon material. During the discharging, the insoluble lithium oxide is formed at the cathode in the pores of the porous carbon material and blocks the passage of the oxygen gas and the lithium ions, which decreases the redox reaction speed and the power density of the lithium-air battery.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "comprise" or "comprising" when utilized, means "include or including, but not necessarily limited to"; it specifically indicates open-ended inclusion or membership in the so-described combination, group, series, and the like. The term "contact" when utilized, means "direct contact" or "physical contact."

Figure 1:
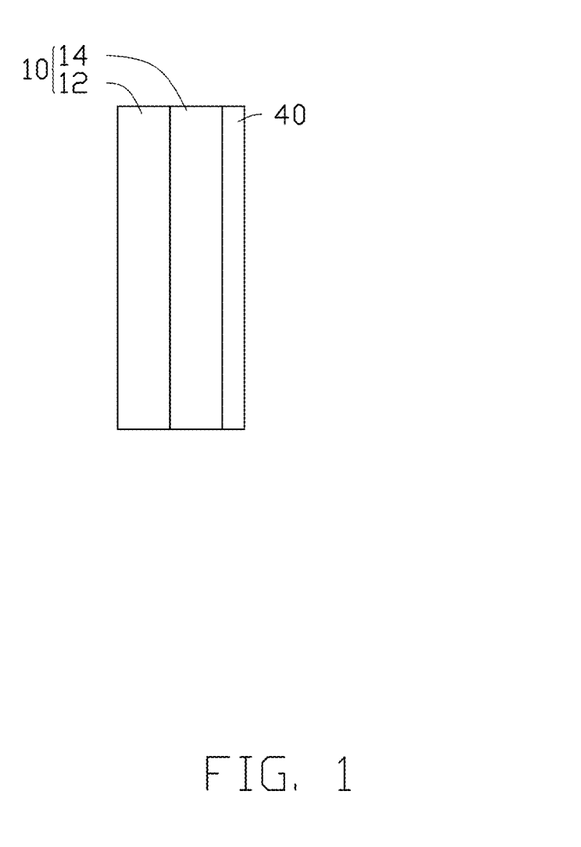
FIG. 1 is a schematic view of an embodiment of a cathode of a lithium-air battery.
Figure 2:
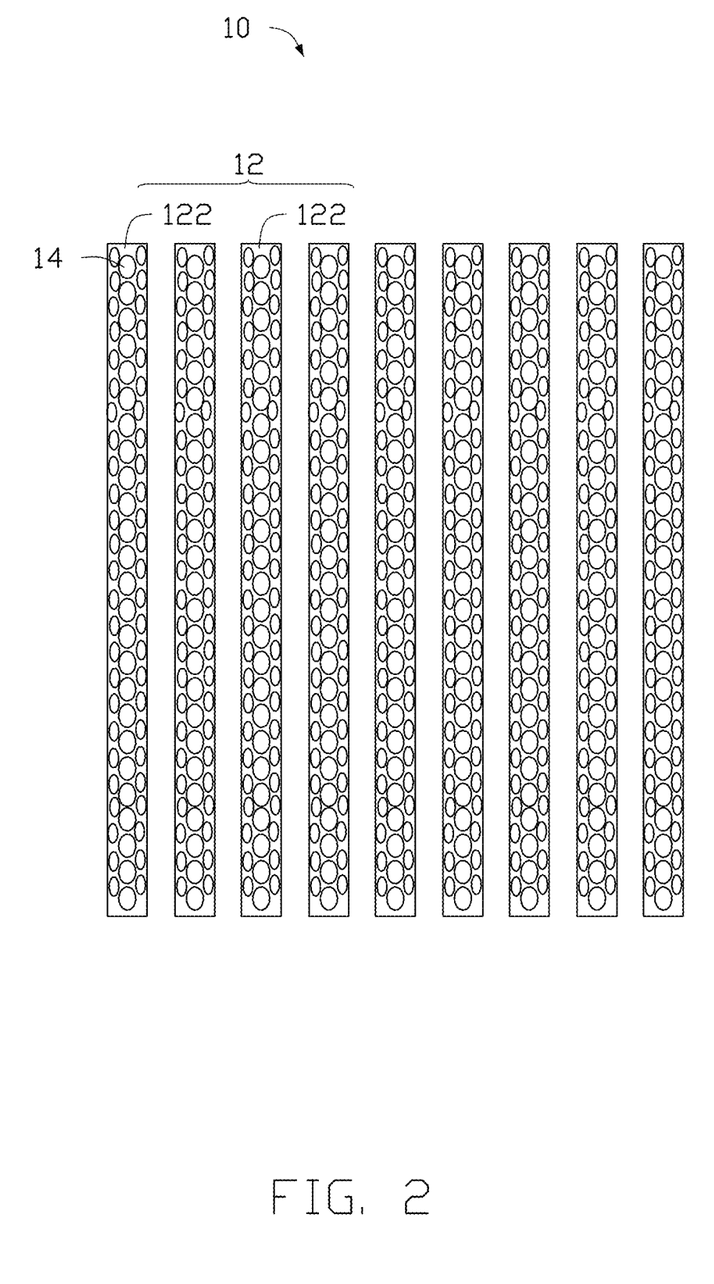
FIG. 2 is a schematic view of an embodiment of a carbon nanotube composite film of the cathode of the lithium-air battery.

Referring to FIG. 1, one embodiment of a cathode 10 of a lithium-air battery is shown. The cathode 10 comprises a carbon nanotube composite film 12 and a protecting layer 14. The carbon nanotube composite film 12 is disposed on a surface of the protecting layer 14. The protecting layer 14 is capable of conducting lithium ions while preventing organic substances in an electrolyte of the lithium-air battery being transmitted to the carbon nanotube composite film 12 to contact with the carbon nanotube composite film 12. Referring to FIG. 2, the carbon nanotube composite film 12 comprises a carbon nanotube network structure 122 and a catalyst 124 in particle form, located on walls of carbon nanotubes of the carbon nanotube network structure 122. The carbon nanotube network structure 122 comprises a plurality of carbon nanotube films which are made of carbon nanotubes and stacked with each other.

Figure 3:
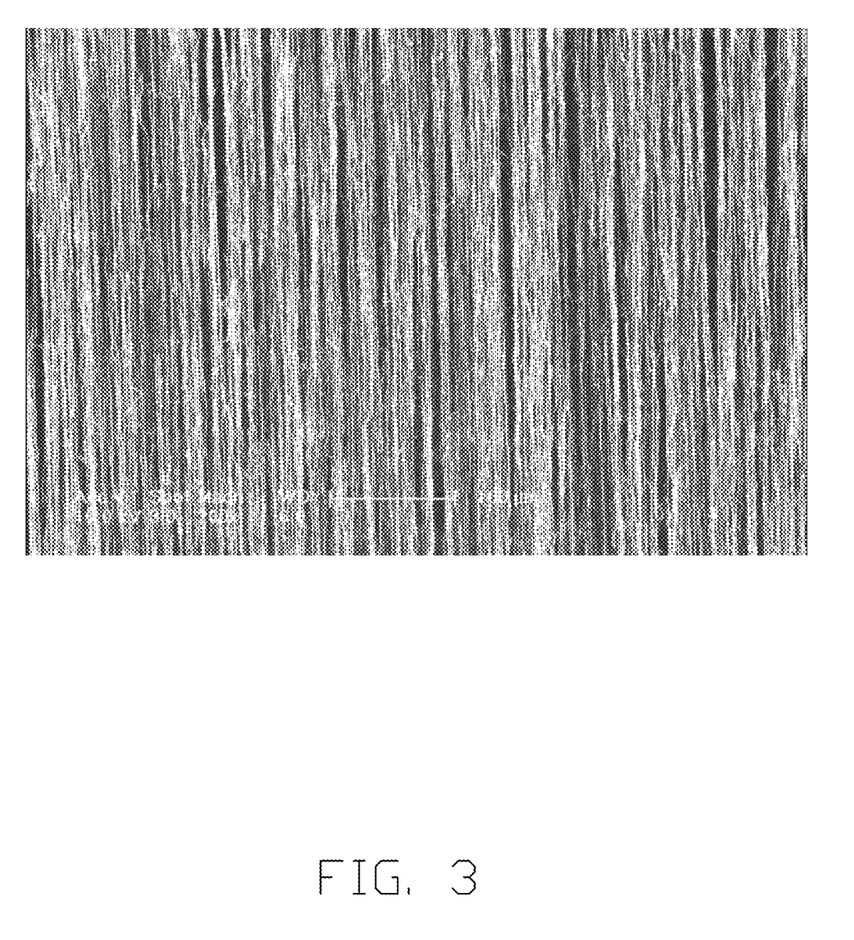
FIG. 3 is a scanning electron microscope (SEM) image of a carbon nanotube film.

Referring to FIG. 3, each carbon nanotube film comprises or consists of a plurality of carbon nanotubes, and the overall aligned direction of a majority of the carbon nanotubes is substantially along the same direction parallel to a surface of the carbon nanotube film. A majority of the carbon nanotubes in the carbon nanotube film are substantially aligned along the same direction. Along the aligned direction of the majority of carbon nanotubes, each carbon nanotube is joined to adjacent carbon nanotubes end to end by van der Waals attractive force therebetween, whereby the carbon nanotube film is capable of being a free-standing structure. A minority of carbon nanotubes in the carbon nanotube film may be randomly aligned. However, the number of the randomly aligned carbon nanotubes is very small and does not affect the overall alignment of the majority of carbon nanotubes in the carbon nanotube film. Some of the majority of the carbon nanotubes in the carbon nanotube film that are substantially aligned along the same direction may not be exactly straight, they may be curved at a certain degree, or a certain degree away from parallel along the overall aligned direction. Therefore, partial contacts can exist between the juxtaposed carbon nanotubes in the majority of the carbon nanotubes aligned along the same direction in the carbon nanotube film. The carbon nanotube film can comprise a plurality of successive carbon nanotube segments. The plurality of carbon nanotube segments are joined end to end by van der Waals attractive force. Each carbon nanotube segment includes a plurality of carbon nanotubes substantially parallel to each other, and the plurality of paralleled carbon nanotubes are in contact with each other and combined by van der Waals attractive force therebetween. Each carbon nanotube segment has a desired length, thickness, uniformity, and shape. There can be clearances between adjacent and juxtaposed carbon nanotubes in the carbon nanotube film. The relatively large specific surface area of the carbon nanotube film makes the carbon nanotube film adhesive. A thickness of the carbon nanotube film at the thickest location is about 0.5 nanometers to about 100 microns (e.g., in a range from 0.5 nanometers to about 10 microns). The carbon nanotube film can be drawn from a carbon nanotube array.

The term "free-standing" includes, but is not limited to, a carbon nanotube film that does not need to be supported by a substrate. For example, a free-standing carbon nanotube film can sustain the weight of itself when hoisted by a portion thereof without significant damage to its structural integrity. If the free-standing carbon nanotube film is placed between two separate supporters, the portion of the free-standing carbon nanotube film suspended between the two supporters maintains structural integrity. The free-standing ability of the carbon nanotube film is realized by the successive carbon nanotubes being joined end to end by van der Waals attractive force.

Figure 4:
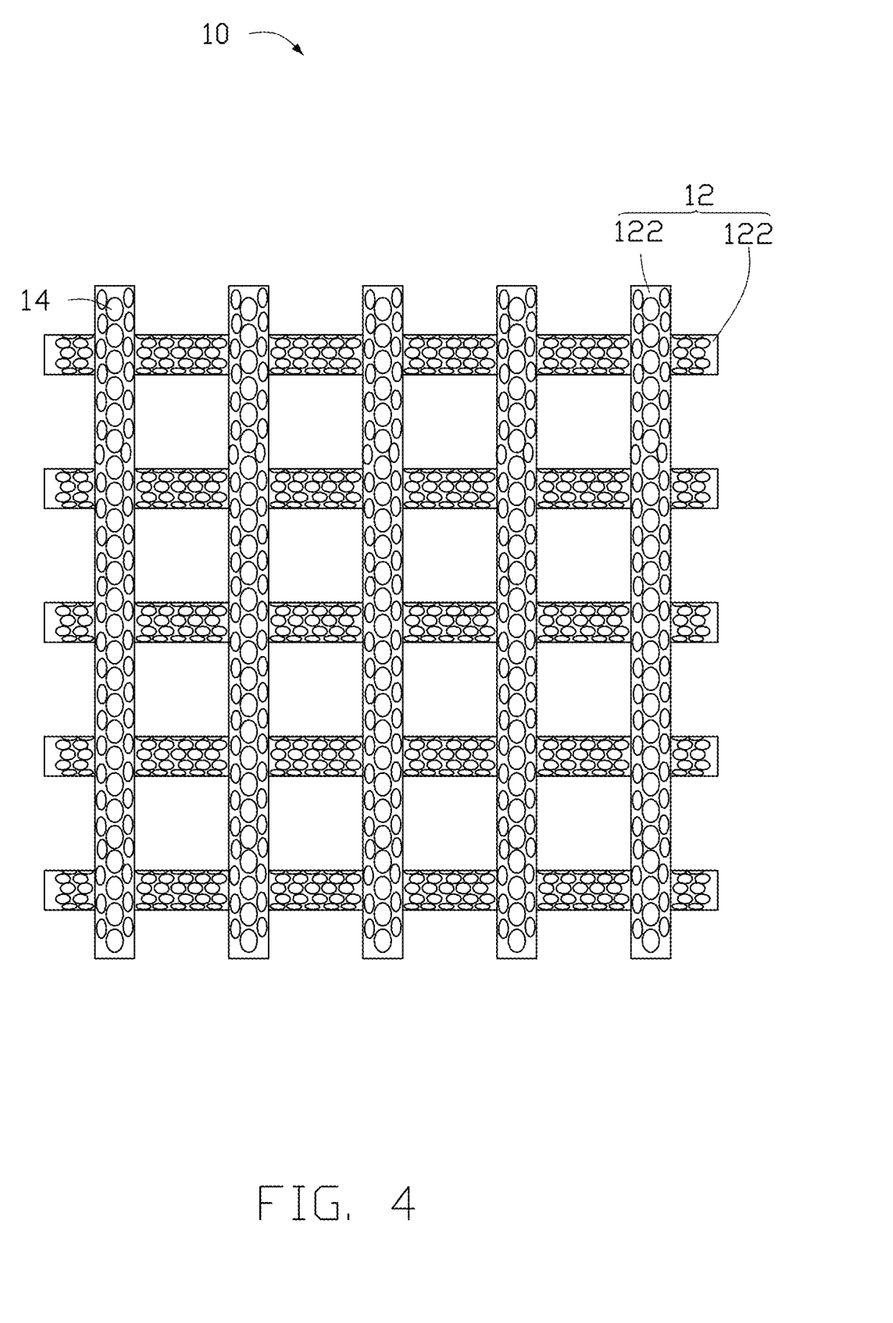
FIG. 4 is a schematic view of another embodiment of the carbon nanotube composite film.

In one embodiment of the carbon nanotube composite film 12, the plurality of carbon nanotube films are stacked along same direction as that of the majority of the carbon nanotubes in the cathode 10. In another embodiment of the carbon nanotube composite film 12, the plurality of carbon nanotube films are stacked along at least two directions as where the carbon nanotubes in the cathode 10 are substantially aligned along at least two directions. Referring to FIG. 4, when the carbon nanotube films are stacked along two different directions, an angle $\beta$ is formed between the carbon nanotubes of one alignment and those of another, and $0° < \beta \leq 90°$. In one embodiment, the angle $\beta$ is $90°$. In the carbon nanotube composite film 12, the number of carbon nanotube films is not limited and can be decided on actual need. In one embodiment, the carbon nanotube composite film 12 comprises 10 to 200 layers of carbon nanotube films stacked on each other. In another embodiment, 100 to 200 layers of carbon nanotube film are stacked. The fewer the number of carbon nanotube films, the smaller the number of carbon nanotubes that can carry the catalyst 124. However, the greater the number of carbon nanotube films, the smaller the size of the pores defined between adjacent carbon nanotubes. In one embodiment, the effective size of the pores defined between the carbon nanotubes in the carbon nanotube network structure 122 can be in a range from about 10 nanometers to 1 micron ($\mu$m). Each of the carbon nanotubes in the plurality of carbon nanotubes in the stacked carbon nanotube films directly contacts and is attached to others due to the van der Waals force, to form the free-standing carbon nanotube network structure 122. The adjacent carbon nanotubes are connected with each other so the carbon nanotube network structure 122 is electrically conductive. A thickness of the carbon nanotube network structure 122 having 100 to 200 layers of stacked carbon nanotube films can be in a range from about 4 $\mu$m to 10 $\mu$m. The carbon nanotube network structure 122 has a relatively uniform thickness and uniform electrical conductivity.

The material of the catalyst 124 can be noble metal such as at least one of ruthenium, platinum, palladium, gold, rhodium, and silver. The catalyst 124 is in particle form, the particles having a size of about 1 nanometer to about 10 nanometers. The particles of the catalyst 124 are uniformly distributed in the carbon nanotube network structure 122 and adsorbed on the outer walls of the carbon nanotubes. There is a large amount of pores defined between adjacent carbon nanotubes having the catalyst 124 adsorbed thereon to form a porous carbon nanotube composite film 12 which is capable of having the lithium ions and oxygen gas infiltrated therein. A weight percentage of the catalyst 124 in the porous carbon nanotube composite film 12 can be in a range from about 50% to about 90%, and from about 75% to about 85% in one embodiment. An amount of the catalyst 124 per unit area of the carbon nanotube network structure 122 can be in a range from 0.5 mg/cm$^2$ to 2 mg/cm$^2$.

The porous carbon nanotube composite film 12 can comprise only the catalyst 124 and the carbon nanotubes. The carbon nanotubes are combined with each other by van der Waals attractive force to form the free-standing carbon nanotube films. The carbon nanotube films are not only the carrier of the catalyst 124 but also the current collector of the cathode 10. Another current collector for the cathode 10 is not required.

In another embodiment, the carbon nanotube composite film 12 can further comprise protective material located on the outer walls of the carbon nanotubes with the catalyst 124. The catalyst 124 is exposed out from the protecting material to make contact with the oxygen gas. The material of the protecting layer 14 can be the same as the protective material in the carbon nanotube composite film 12. The protective material located on the carbon nanotubes may form a coating on each carbon nanotube. A thickness of the layer formed from the protective material can be in a range from about 10 nanometers to about 1 micron.

The protecting layer 14 is located on a surface of the carbon nanotube composite film 12 facing the anode of the lithium-air battery. The protecting layer 14 prevents the organic substances in the electrolyte, such as the solvent, from contacting the carbon nanotube composite film 12. Meanwhile, the protecting layer 14 allows the conduction of the lithium ions in the electrolyte to the carbon nanotube composite film 12. The material of the protecting layer 14 can be selected from $Li_3PO_4$, $Li_{1.3}Al_{0.3}Ti_{0.7}(PO_4)_3$, $Li_{3.6}Si_{0.6}P_{0.4}O_4$, $Li_5La_3Ta_2O_{12}$, $Li_7La_3Zr_2O_{12}$, $Li_3N$, and combinations thereof. The protecting layer 14 can have a thickness of about 0.1 microns to about 10 microns.

Figure 5:
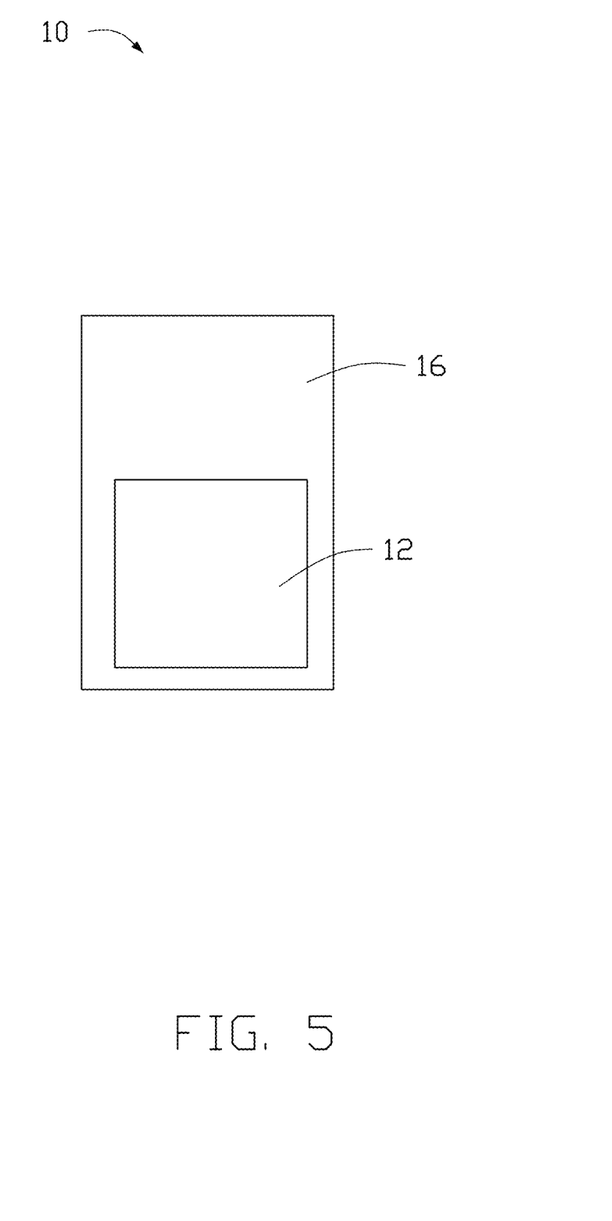
FIG. 5 is a schematic view of another embodiment of the cathode of the lithium-air battery.

Referring to FIG. 5, in another embodiment, the cathode 10 can further comprise a cathode current collector 16. The carbon nanotube composite film 12 is stacked on a surface of the cathode current collector 16 and sandwiched between the cathode current collector 16 and the protecting layer 14. The cathode current collector 16 electrically connects the carbon nanotube composite film 12 with an external circuit. The cathode current collector 16 can be a porous free-standing sheet. In one embodiment, the cathode current collector 16 can be a metal mesh made of nickel, copper, aluminum, titanium, or stainless steel. In another embodiment, the cathode current collector 16 can be a structure formed of carbon material such as carbon fiber textile sheet, carbon nanotube paper, porous graphene sheet, carbon nanotube-graphene composite sheet, or pyrolyzed carbon sheet.

Figure 6:
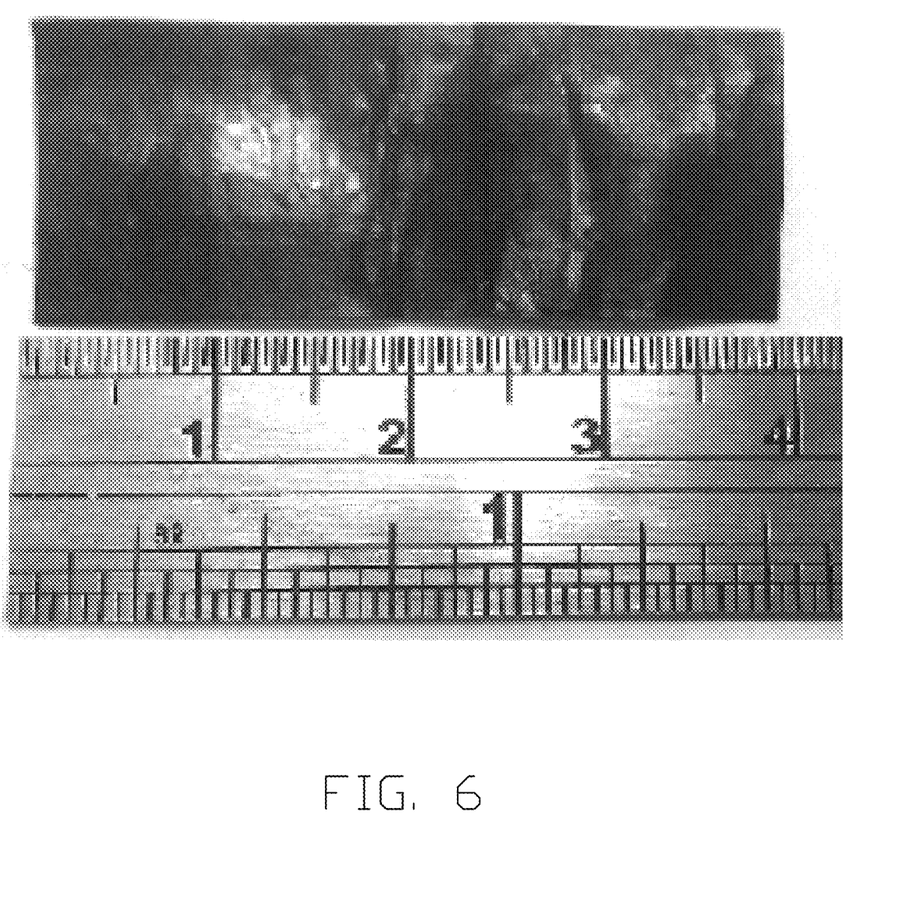
FIG. 6 is a photograph of a carbon nanotube paper.

Referring to FIG. 6, in one embodiment, the cathode current collector 16 is carbon nanotube paper which is a black, thin, free-standing sheet that is as flexible as paper and able to endure bending. The thickness of the carbon nanotube paper can be in a range from about 500 nm to about 500 μm. The carbon nanotubes paper can consist of about 50 layers to about 1000 layers of the carbon nanotube films stacked with each other. Each carbon nanotube film comprises a plurality of carbon nanotubes arranged along the same direction. The structure of the carbon nanotube film of the carbon nanotube film paper can be the same as the structure of the carbon nanotube film of the carbon nanotube network structure 122. The carbon nanotube film of the carbon nanotube film paper can be a free-standing carbon nanotube film that is drawn from the carbon nanotube array. The carbon nanotube film has a relatively large specific surface area, so the carbon nanotube film is very adhering. In the carbon nanotube paper, adjacent carbon nanotube films can be combined together by van der Waals forces. Once the adjacent carbon nanotube films are stacked, the carbon nanotube films can form an integrated structure, and adjacent carbon nanotube films cannot be separated from each other. Spaces can be defined between adjacent carbon nanotubes in the carbon nanotube films to form a plurality of pores in the carbon nanotube paper, allowing the oxygen gas to pass through.

In one embodiment, in the carbon nanotube paper, the carbon nanotube films are aligned along the same direction as the aligned majority of the carbon nanotubes. The carbon nanotubes paper has an excellent electrical conductivity in this particular direction. The carbon nanotube paper is used as the cathode current collector 16 in the cathode 10 to collect and conduct the current from the carbon nanotube network structure 122 to the external circuit.

In one embodiment, the direction of the carbon nanotubes of at least one carbon nanotube film in the carbon nanotube network structure 122 is the same as that of the carbon nanotubes in the carbon nanotube paper. At least a portion of the carbon nanotubes in the carbon nanotube network structure 122 are aligned along the same direction as that of the carbon nanotubes in the cathode current collector 16. Thus, the contact area of the carbon nanotubes increases when the current collector 16 is in contact with the carbon nanotube network structure 122, to enhance the combination therebetween.

The carbon nanotube network structure 122 and the carbon nanotube paper can be in direct contact with each other and combined by van der Waals attractive forces, without additional binder. That is to say, the carbon nanotubes of the carbon nanotube paper are in direct contact with the carbon nanotubes of the carbon nanotube network structure 122. The carbon nanotube films of the carbon nanotube paper and the carbon nanotube network structure 122 have relatively large specific surface area. Once the carbon nanotube paper and the carbon nanotube network structure 122 are stacked and combined by the van der Waals forces, it will be difficult to separate them from each other. In one embodiment, the carbon nanotube network structure 122 is smaller than the carbon nanotube paper, and can be located on one end of carbon nanotube paper. The other end of the carbon nanotube paper can be used to connect to the external circuit.

In the cathode 10, the catalyst 124 is located not only on an outer surface of the carbon nanotube network structure 122 but is also infiltrated into the carbon nanotube network structure 122, and adsorbed on the outer walls of the carbon nanotubes, to efficiently adopt the carbon nanotubes as the carrier of the catalyst 124. The carbon nanotube composite film 12 having the catalyst 124 carried by the carbon nanotube network structure 122 has a plurality of micropores defined by adjacent carbon nanotubes to permit the passage of the oxygen gas and the lithium ions to make contact with the catalyst 124 in the carbon nanotube network structure 122. The material of the catalyst 124 is a noble metal, which is highly active, so that not only catalyzes the reaction between the oxygen gas and the lithium ions to form $Li_2O_2$ but also catalyzes the decomposition of the organic substances such as the solvent and the polymer in the electrolyte to form $CO_2$. The side reactions caused by the catalyst 124 gradually degrade the cycling performance of the lithium-air battery. The separation by the protecting layer 14 of the organic substances in the electrolyte 30 from the carbon nanotube composite film 12 avoids the side reactions during the discharging process of the lithium-air battery, to improve the cycling performance.

One embodiment of a method for making the cathode 10 of the lithium-air battery comprises: providing a plurality of carbon nanotube film drawn from a carbon nanotube array; depositing a plurality of particles made of the catalyst 124 on each of the carbon nanotube films to form a plurality of carbon nanotube-catalyst composite films; stacking the plurality of carbon nanotube-catalyst composite films together to form the carbon nanotube composite film 12; and forming the protecting layer 14 on the surface of the carbon nanotube composite film 12. In another embodiment, the cathode 10 comprises the carbon nanotube paper as the current collector. The plurality of carbon nanotube-catalyst composite films are stacked on the carbon nanotube paper to form the carbon nanotube composite film 12.

The particles of the catalyst 124 can be deposited on the carbon nanotube film by using a chemical depositing method or a physical depositing method, such as vacuum evaporating method or magnetron sputtering method. By controlling the depositing time of the catalyst 124, the weight percentage of the catalyst 124 in the cathode 10 can be controlled. The protecting layer 14 can be formed by sputtering method, sol-gel method, hydrothermal synthesizing method, or solvothermal synthesizing method.

Figure 7:
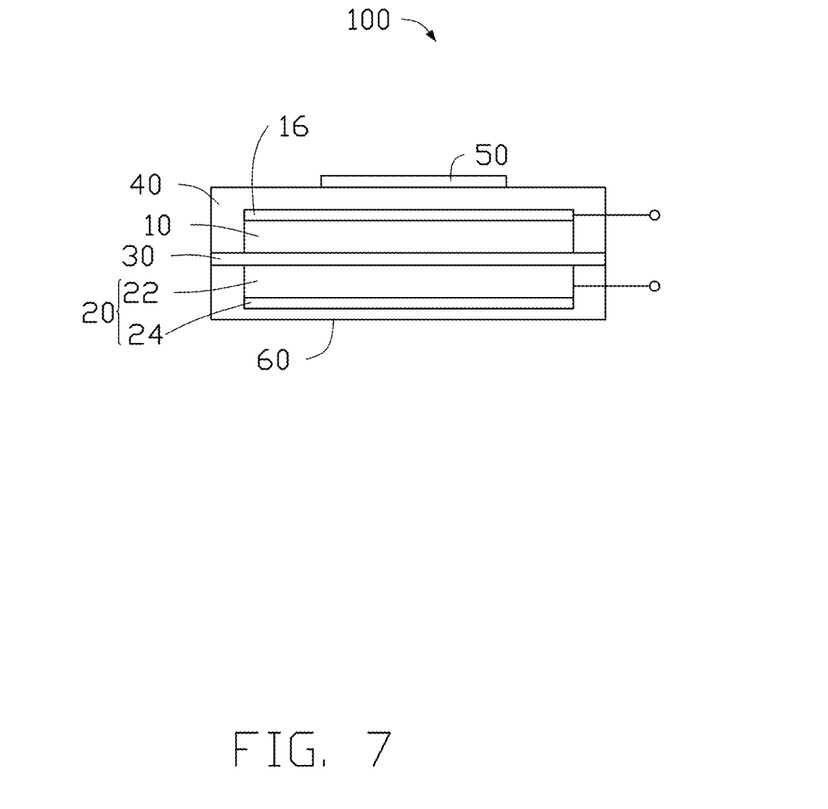
FIG. 7 is a schematic view of an embodiment of the lithium-air battery.

Referring to FIG. 7, one embodiment of a lithium-air battery 100 comprises the above described cathode 10, an anode 20, and an electrolyte 30.

The anode 20 comprises an anode active material layer 22, which can be lithium metal or alloy, such as at least one of lithium aluminum alloy, lithium tin alloy, lithium lead alloy, and lithium silicon alloy. The anode 20 can further comprise an anode current collector 24 electrically connecting the anode active material layer 22 to the external circuit. The anode active material layer 22 is located on a surface of the anode current collector 24. The anode current collector 24 can be a free-standing sheet. In one embodiment, the anode current collector 24 can be a metal foil without holes or metal mesh with a plurality of through holes. The metal of the anode current collector 24 can be nickel, copper, or stainless steel. In another embodiment, the anode current collector 24 can be a structure formed of a carbon material such as carbon fiber textile sheet, carbon nanotube paper, porous graphene sheet, carbon nanotube-graphene composite sheet, or pyrolyzed carbon sheet.

The electrolyte 30 is located between the cathode 10 and the anode 20 to conduct lithium ions. The electrolyte can be a solid electrolyte film or a liquid electrolyte solution including a metal salt dissolved in an organic solvent. The organic solvent can be at least one of ethylene carbonate (EC), propylene carbonate (PC), ethylmethyl carbonate (EMC), diethyl carbonate (DEC), dimethyl carbonate (DMC), butylenes carbonate, vinylene carbonate, methylethyl carbonate, methyl acetate, ethyl acetate, propyl acetate, methyl propionate, ethyl propionate, γ-butyrolactone, 1,2-dimethoxyethane, 1,2-diethoxyethane, tetrahydrofuran, 1,2-dioxane, 2-methyltetrahydrofuran, acetonitrile, tetra(ethylene glycol) dimethyl ether (TEGDME), and dimethylformamide. In the embodiment of the lithium-air battery, the lithium salt can be at least one of $LiCl$, $LiPF_6$, $LiBF_4$, $LiCH_3SO_3$, $LiCF_3SO_3$, $LiAsF_6$, $LiSbF_6$, $LiClO_4$, $Li[BF_2(C_2O_4)]$, $Li[PF_2(C_2O_4)_2]$, $Li[N(CF_3SO_2)_2]$, $Li[C(CF_3SO_2)_3]$, LiBOB, and lithium bis(trifluoromethane sulfonyl) imide (LiTFSI). The liquid electrolyte solution infiltrates the anode 20 and is insulated from the carbon nanotube composite film 12 of the cathode 10 by the protecting layer 14.

The lithium-air battery 100 can further comprise a porous membrane being a separator 40 located between the cathode 10 and the anode 20. The material of the separator can be polypropylene (PP) or polyethylene (PE).

The lithium-air battery 100 can further comprise an air-diffusion membrane 50 arranged on the side adjacent to the cathode 10 of the lithium-air battery 100. Oxygen gas can enter the cathode 10 through the air-diffusion membrane 50, but water and carbon dioxide gas in the air can be prevented from entering the cathode 10.

The lithium-air battery 100 can further comprise a battery case 60 encapsulating the cathode 10, the anode 20, the electrolyte 30, and the separator 40. The air-diffusion membrane 50 can be located on an opening defined by the battery case 60 at the side adjacent to the cathode 10.

EXAMPLE 1

Figure 8:
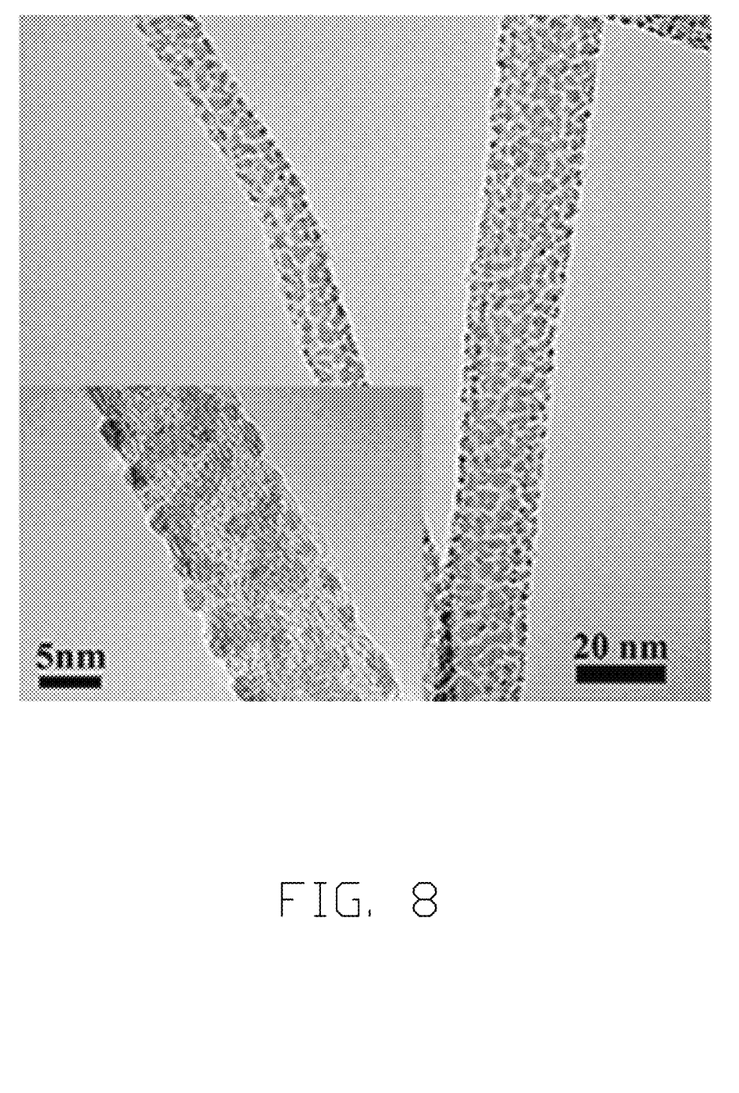
FIG. 8 is a transmission electron microscopy (TEM) image of the cathode containing ruthenium (Ru) catalyst of the lithium-air battery.
Figure 9:
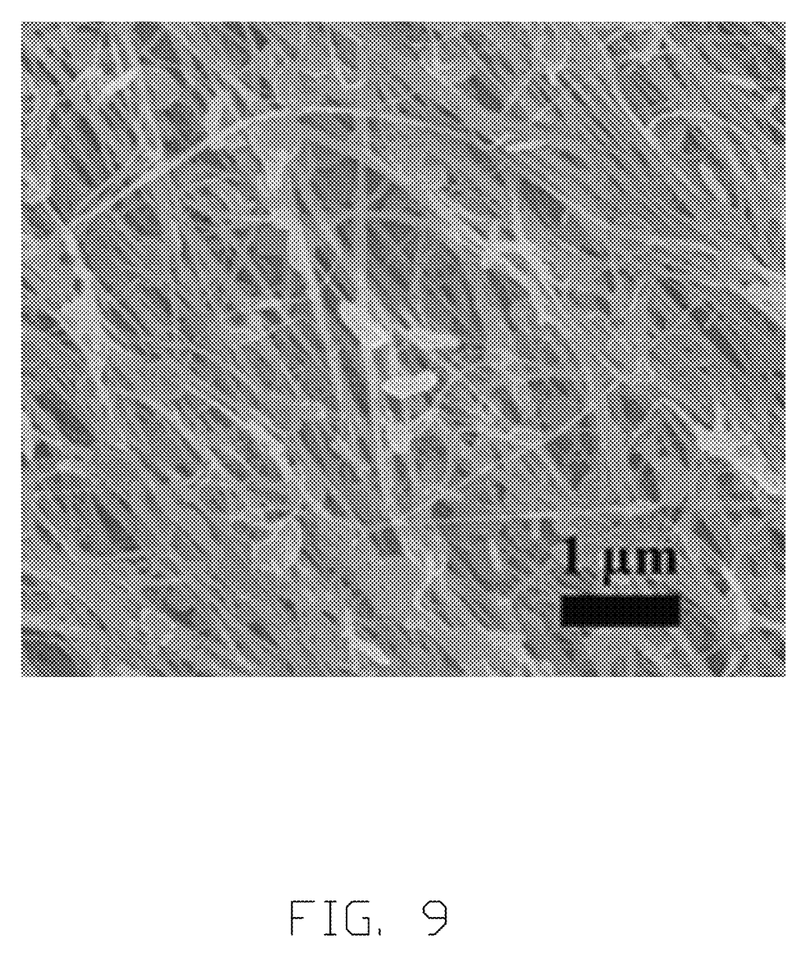
FIG. 9 is an SEM image of the cathode containing Ru catalyst of the lithium-air battery after being discharged.

The carbon nanotube films are drawn from the carbon nanotube array and deposited with Ru metal particles through the sputtering method to form the carbon nanotube-catalyst composite films. Referring to FIG. 8, an average diameter of the Ru metal particles is in a range from about 3 nanometers to about 5 nanometers. The Ru metal particles are uniformly distributed on the outer walls of the carbon nanotubes. The cathode 10 comprises the carbon nanotube paper as the cathode current collector 16. One hundred layers of carbon nanotube-catalyst composite films are stacked on the surface of the carbon nanotube paper along two directions which are perpendicular to each other to form the carbon nanotube composite film 12. An N doped $Li_3PO_4$ layer as the protecting layer 14, having a thickness of about 1 micron, is deposited on the surface of the carbon nanotube composite film 12 by the sputtering method. The carbon nanotube paper comprises 500 layers of carbon nanotube films stacked with each other. The thickness of the carbon nanotube paper is about 40 microns. The anode 20 is the lithium metal. The electrolyte 30 is 0.1 mol/L of LiTFSI dissolved in TEGDME. After electrical discharge of the lithium-air battery 100, the cathode 10 is taken out from the battery case and observed under SEM. Referring to FIG. 9, the solid particles formed on the outer walls of the carbon nanotubes are $Li_2O_2$ having an average size of about 300 nanometers to about 500 nanometers. The lithium-air battery 100 discharges at a current density of about 500 mA/g and cuts off at a specific capacity of about 1000 mAh/g. The discharge voltage plateau is about 2.6V, which is very close to the theoretic value of 2.96V, revealing a relatively high electrode reacting efficiency of the cathode 10 of the lithium-air battery 100.

EXAMPLE 2

Figure 10:
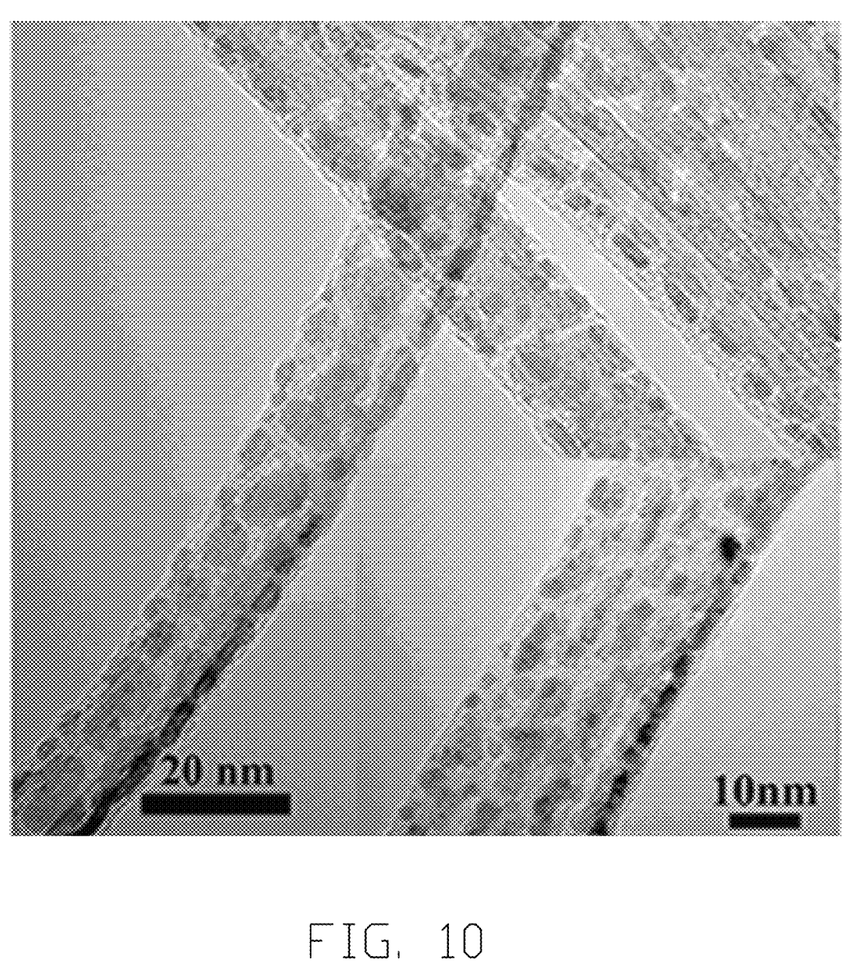
FIG. 10 is a TEM image of the cathode containing palladium (Pd) catalyst of the lithium-air battery.
Figure 11:
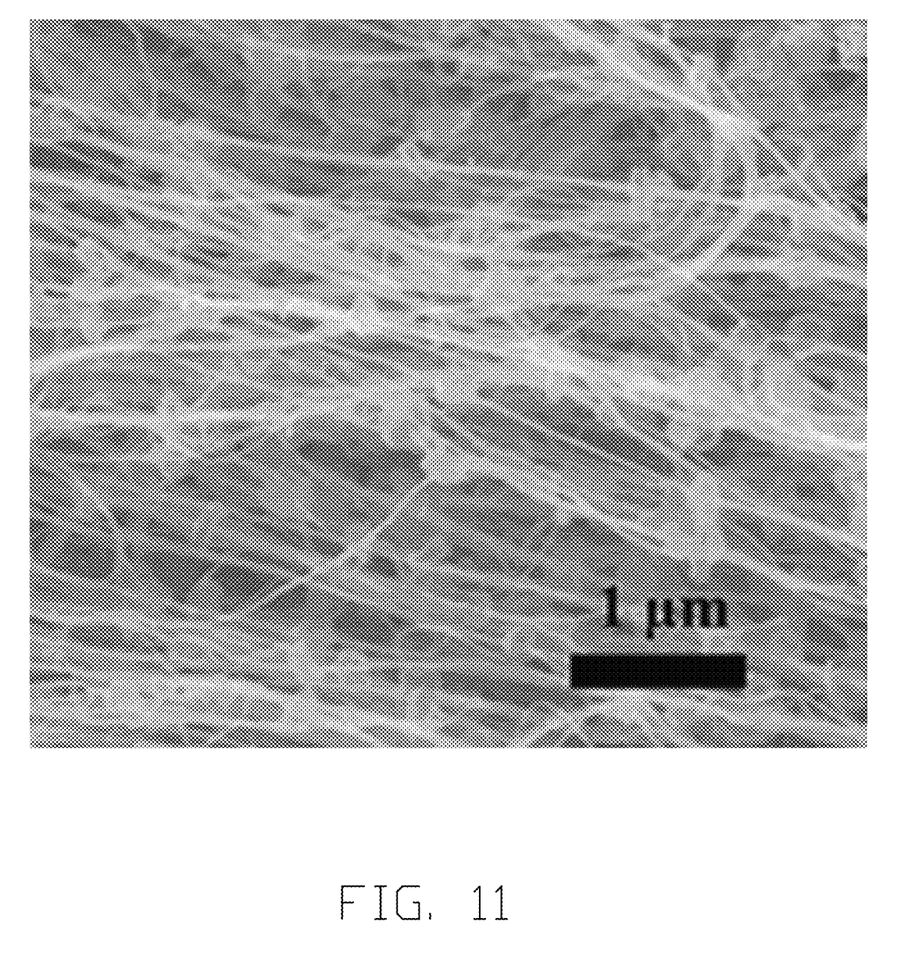
FIG. 11 is an SEM image of the cathode containing Pd catalyst of the lithium-air battery after being discharged.

The carbon nanotube films are drawn from the carbon nanotube array and Pd metal particles are deposited thereon through the sputtering method to form the carbon nanotube-catalyst composite films. Referring to FIG. 10, an average diameter of the Pd metal particles is in a range from about 5 nanometers to about 10 nanometers. The Pd metal particles are uniformly distributed on the outer walls of the carbon nanotubes. The cathode 10 comprises the carbon nanotube paper as the cathode current collector 16. One hundred layers of carbon nanotube-catalyst composite films are stacked on the surface of the carbon nanotube paper along two directions perpendicular to each other to form the carbon nanotube composite film 12. An N doped $Li_3PO_4$ layer as the protecting layer 14, having a thickness of about 1 micron, is deposited on the surface of the carbon nanotube composite film 12 by the sputtering method. The carbon nanotube paper comprises 500 layers of carbon nanotube films stacked with each other. The thickness of the carbon nanotube paper is about 40 microns. The anode 20 is the lithium metal. The electrolyte 30 is 0.1 mol/L of LiTFSI dissolved in TEGDME. After electrical discharge of the lithium-air battery 100, the cathode 10 is taken out from the battery case and observed under SEM. Referring to FIG. 11, the solid particles formed on the outer walls of the carbon nanotubes are $Li_2O_2$ having an average size of about 300 nanometers to about 500 nanometers. The lithium-air battery 100 discharges at a current density of about 500 mA/g and cuts off at a specific capacity of about 1000 mAh/g. The discharge voltage plateau is about 2.7V, which is very close to the theoretic value of 2.96V, revealing a relatively high electrode reacting efficiency of the cathode 10 of the lithium-air battery 100.

Depending on the embodiment, certain of the steps of methods described may be removed, others may be added, and the sequence of steps may be altered. It is also to be understood that the description and the claims drawn to a method may comprise some indication in reference to certain steps. However, the indication used is only to be viewed for identification purposes and not as a suggestion as to an order for the steps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A cathode of a lithium-air battery, the cathode comprising:
   a carbon nanotube composite film comprising a carbon nanotube network structure a catalyst in particle form located in the carbon nanotube network structure and a protective material, wherein the carbon nanotube network structure comprises 100 to 200 layers of carbon nanotube films stacked with each other, and each of the carbon nanotube films comprises a plurality of carbon nanotubes arranged substantially along a same direction, the protective material is located on out walls of the plurality of carbon nanotubes, the catalyst is exposed out from the protecting material;

a protecting layer, the carbon nanotube composite film is disposed on a surface of the protecting layer, and the protecting layer is capable of conducting lithium ions while preventing organic substances in an electrolyte of the lithium-air battery contacting the carbon nanotube composite film.

2. The cathode of claim 1, wherein a material of the catalyst is selected from the group consisting of ruthenium, platinum, palladium, gold, rhodium, silver, and combinations thereof.

3. The cathode of claim 1, wherein a diameter of the catalyst is in a range from about 1 nanometer to about 10 nanometers.

4. The cathode of claim 1, wherein a weight percentage of the catalyst in the carbon nanotube composite film is in a range from about 50% to about 90%.

5. The cathode of claim 1, wherein an amount of the catalyst per unit area of the carbon nanotube network structure is in a range from 0.5 mg/cm$^2$ to 2 mg/cm$^2$.

6. The cathode of claim 1, wherein the plurality of carbon nanotubes are joined end to end by van der Waals attractive force therebetween.

7. The cathode of claim 1, wherein the carbon nanotube network structure is a free-standing structure and a cathode current collector.

8. The cathode of claim 1 further comprising a cathode current collector, wherein the carbon nanotube network structure is located on a surface of the cathode current collector.

9. The cathode of claim 8, wherein the cathode current collector is selected from the group consisting of a metal mesh, a carbon fiber textile sheet, a carbon nanotube paper, a porous graphene sheet, a carbon nanotube-graphene composite sheet, and a pyrolyzed carbon sheet.

10. The cathode of claim 8, wherein the cathode current collector is a carbon nanotube paper comprising another plurality of carbon nanotube films stacked with each other.

11. The cathode of claim 1, wherein a material of the protecting layer is selected from the group consisting of $Li_3PO_4$, $Li_{1.3}Al_{0.3}Ti_{0.7}(PO_4)_3$, $Li_{3.6}Si_{0.6}P_{0.4}O_4$, $Li_5La_3Ta_2O_{12}$, $Li_7La_3Zr_2O_{12}$, $Li_3N$, and combinations thereof.

12. A lithium-air battery comprising:
an anode comprising lithium metal;
a cathode comprising:
a carbon nanotube composite film comprising a carbon nanotube network structure a catalyst in particle form located in the carbon nanotube network structure and a protective material, wherein the carbon nanotube network structure comprises 100 to 200 layers of carbon nanotube films stacked with each other, and each of the carbon nanotube films comprises a plurality of carbon nanotubes arranged substantially along a same direction, the protective material is located on out walls of the plurality of carbon nanotubes, the catalyst is exposed out from the protecting material; and
a protecting layer, the carbon nanotube composite film is disposed on a surface of the protecting layer; and
an electrolyte located between the cathode and the anode, wherein the protecting layer is capable of conducting lithium ions while preventing organic substances in the electrolyte contacting the carbon nanotube composite film.

13. The cathode of claim 1, wherein the carbon nanotube network structure comprises a plurality of carbon nanotube films stacked with each other, and each of the plurality of carbon nanotube films consists a plurality of carbon nanotubes aligned substantially parallel to a surface of the each of the plurality of carbon nanotube films and along a same direction.

14. The cathode of claim 1, wherein a thickness of the carbon nanotube film at the thickest location is in a range from about 0.5 nanometers to about 100 microns.

15. The cathode of claim 12, wherein a thickness of the carbon nanotube network structure is in a range from 4 μm to 10 μm.

16. The cathode of claim 12, wherein a thickness of the carbon nanotube film at the thickest location is in a range from about 0.5 nanometers to about 100 microns.

17. The cathode of claim 1, wherein a material of the protecting layer is the same as the protective material in the carbon nanotube composite film.

18. The cathode of claim 1, wherein the protective material form a coating on each of the plurality of carbon nanotubes.

* * * * *